United States Patent [19]
Cornelius et al.

[11] 3,853,929
[45] Dec. 10, 1974

[54] METHOD FOR CONTINUOUSLY EFFECTING SOLID-CATALYZED LIQUID PHASE REACTIONS IN A BUBBLE COLUMN-CASCADE REACTOR

[75] Inventors: Wolf Cornelius, Werne; Bodo Gross, Unna; Jochen Meiners, Unna-Siddinghausen; Eckhart Blass; Kurt-Henning Koch, both of Clausthal-Zellerfeld, all of Germany

[73] Assignee: Schering AG, Berlin, Bergkamen, Germany

[22] Filed: Nov. 14, 1972

[21] Appl. No.: 306,198

[30] Foreign Application Priority Data
Nov. 22, 1971 Germany.......................... 2157737

[52] U.S. Cl.................. 260/407, 23/252 R, 23/283, 23/288 E, 261/122, 423/659
[51] Int. Cl. .......................... B01j 9/16, C08h 9/00
[58] Field of Search.......... 23/288 E, 283, 284, 285, 23/252 R; 423/659; 260/407, 409, 695; 261/122; 134/25 R

[56] References Cited
UNITED STATES PATENTS

| | | | |
|---|---|---|---|
| 2,930,808 | 3/1960 | Zosel | 23/252 R X |
| 3,482,946 | 12/1969 | Shirk | 23/284 |
| 3,507,890 | 4/1970 | Dieckelmann et al. | 260/407 |
| 3,701,793 | 10/1972 | Schmidt et al. | 23/284 X |

Primary Examiner—Joseph Scovronek
Attorney, Agent, or Firm—Curtis, Morris & Safford

[57] ABSTRACT

A method for continuously effecting reactions in a liquid phase in the presence of a gas and of a finely divided solid catalyst in a bubble column-cascade reactor with little or no liquid back-mixing, dwell time in the reactor being dependent on the liquid and gas throughputs, said reactor comprising a vertical column and a plurality of equidistantly-spaced, horizontally mounted, uniformly-perforated plates therein, the aperture area of each plate being dependent on the cross-sectional area of the column and the plate spacing within the column being such that adjacent plates are separated vertically by a distance at least three times the diameter of said columnar reaction zone.

4 Claims, 3 Drawing Figures

METHOD FOR CONTINUOUSLY EFFECTING SOLID-CATALYZED LIQUID PHASE REACTIONS IN A BUBBLE COLUMN-CASCADE REACTOR

The present invention relates to a method for continuously effecting solid-catalyzed liquid phase reactions in the presence of a gas in a bubble column-cascade reactor.

An object of the present invention is the continuous reaction of a liquid with a liquid in the presence of a gas and a finely-divided solid catalyst, with a dwell time approaching or corresponding to that in an ideal cascade of stirred vessels.

A feature of the present invention is a method for effecting such a continuous reaction in a reactor in which the desired dwell time is achieved by control of the throughput of liquid and gas.

It is already known from German U.S. Pat. No. 1,028,096 to attempt to produce a gas cushion in a flow-reactor beneath the sieve plates thereof by using sieve plates whose apertures must be less than 1 millimeter in diameter. However, the patent describes no measures sufficient for the reproducible formation of a gas cushion.

According to the present invention, one or more liquid reagents are continuously reacted in the presence of an inert and/or reactive gas in the presence of a finely divided solid catalyst by passing the reagents in an upwardly directed parallel flow through a tubular flow reactor having perforated plates therein. By using an appropriate throughput of liquid and gas, a dwell time in the reactor is sought which approximates or corresponds with that in an ideal cascade of stirred vessels.

The tubular flow reactor preferred for use in the present invention comprises a vertical column having a plurality of perforated plates therein. The total aperture area of the perforated plates is from 0.5 to 15 percent of the empty reactor cross-section, preferably from 0.5 to 5 percent. The perforated plates are tightly joined to, i.e., in close contact with, the interior wall of the column and are incorporated in the column in an exactly horizontal position. The individual apertures of each perforated plate are of the same size and are uniformly distributed over the plate. The distance between two adjacent perforated plates is uniform (i.e., the plates are equidistant) and is greater than three times the diameter of the reactor column.

In a preferred embodiment, the apertures are formed as right circular cylinders, which may optionally be beveled at their lower end, i.e., at the plate bottoms, or may be frustoconical in vertical cross-section.

In a further preferred embodiment, a finely-divided solid catalyst is present in the reagent stream entering the reactor in a catalytic amount, which, in kilograms per hour, may be up to 20 percent of the liquid entering the reactor, in kilograms per hour.

The geometry of the reactor and of the perforated plates, as well as the volume of the streams of gas and suspension appropriate thereto, inhibits axial back-mixing of the phases between the individual reactor sections defined between the perforated plates. If a stable gas cushion is formed under every perforated plate, referred to in the following specification as a "special flow condition," axial back-mixing is completely hindered.

The liquid and gaseous contents of the individual reactor segments are turbulently mixed with one another by the high gas throughput and by the constant new dispersion of gas in the reaction mixture at the perforated plates, whereby a high mass transfer is achieved. By reduction of the gas throughput below the minimum value necessary for the formation of a gas cushion, the degree of mass transfer is, to be sure, decreased. However, even with a reduction in the gas throughput up to 50 percent of this minimum value, back-mixing between the reactor segments is still sufficiently hindered. A decreased degree of mass transfer has no influence on reactions determined by reaction velocity.

In the reactor, each reactor segment contains a bubble layer whose gas-holdup increases with increasing height of the segment. If back-mixing of liquid is to be completely avoided, then a gas cushion like that mentioned earlier is found above the bubble layer and occupies the space to the floor of the next reactor segment. Each of the reactor segments, thus, is a bubble column reactor so that the complete reactor can be characterized as a bubble column-cascade reactor.

If back-mixing of a suspension through the apertures of the perforated plates is reduced to a minimum or completely hindered by formation of a gas cushion, by means of a correspondingly chosen volume of the gas stream, then the bubble column-cascade reactor of the invention has the same dwell time as an ideal cascade of stirred vessels, since the gas simultaneously effects good mixing of the liquid in the individual reactor segments.

It is known in the art that an ideal cascade of stirred vessels has an ideal mixture of the liquid reagent present in each stirred vessel and that back-mixing between the separate stirred vessels is impossible. Still, a slight back-mixing of liquid or of suspension through the apertures of the perforated plates in the aforementioned reactor similarly has no measurable influence on the dwell time behavior.

Since such a bubble column-cascade reactor behaves, from the point of view of the dwell time, like a cascade of stirred vessels, well-known equations can be applied to the system for calculating and determining average dwell time and therewith, for achieving an independence of the reactor contents from the required product throughput [cf. J. Kardos, Chemische Technik 4, 216 – 220 (1969) and 5, 275 – 280 (1969)]. With the process of the present invention, the same dwell time as in an ideal cascade of stirred vessels can be achieved with a considerably reduced technical outlay. In addition, it is possible at will to produce long dwell times of a liquid or suspension in the reactor.

A better understanding of the present invention will be had by referring to the drawing, wherein FIG. 1 is a schematic drawing of a reaction system incorporating a reactor (shown in a side sectional view) suitable for practicing the present invention;

Figure 1:
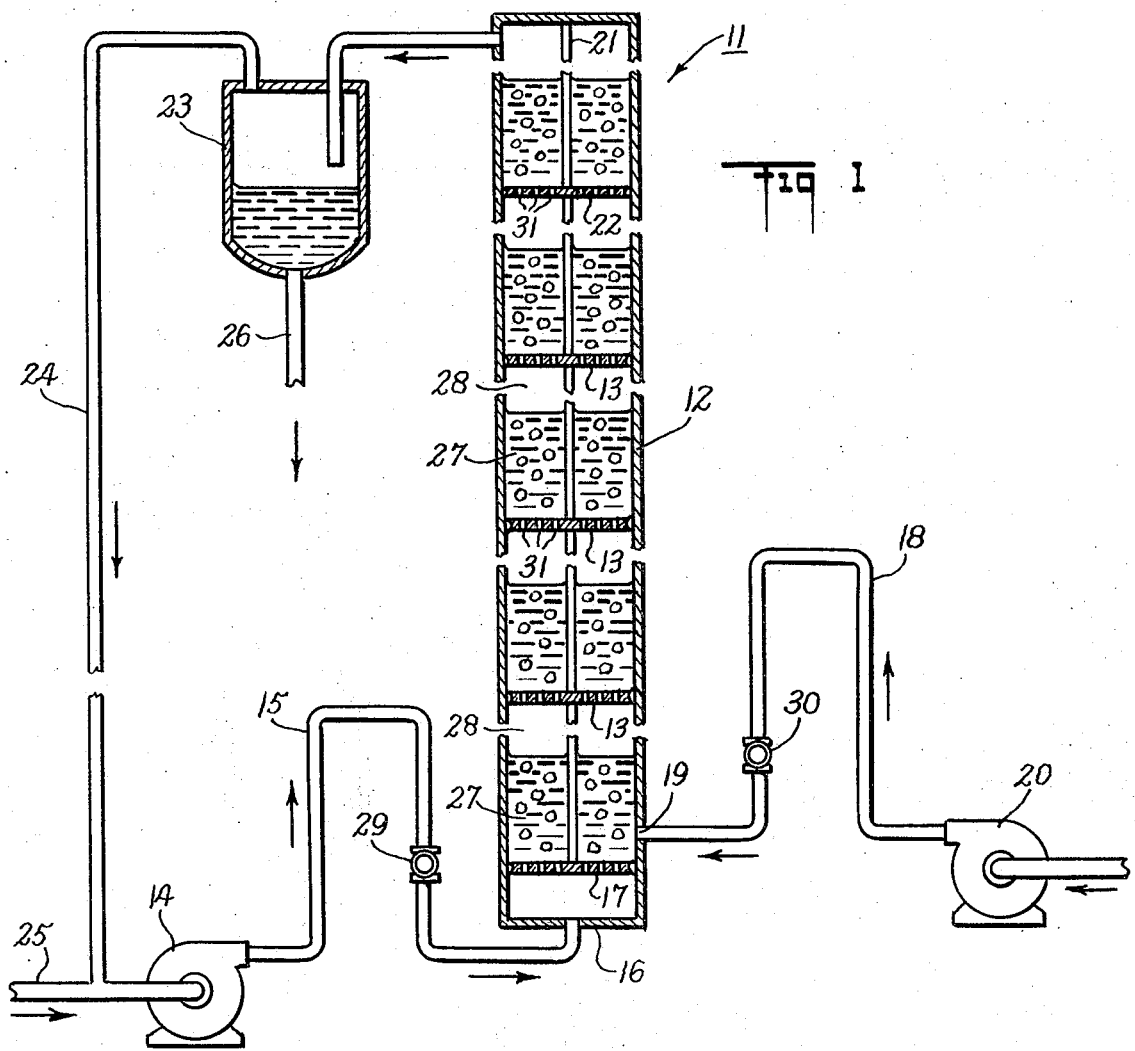

FIG. 1 shows reactor 11 comprising cylindrical column 12 having therein a plurality of perforated plates 13 equidistantly spaced from each other. Gas, moved by means such as compressor 14, enters reactor 11, through line 15, at the reactor bottom 16, beneath lowermost perforated plate 17. A suspension of a catalytic solid in a liquid enters reactor 11, through line 18, at 19, above lowermost plate 17. The liquid is moved by means such as pump 20.

Figure 2:
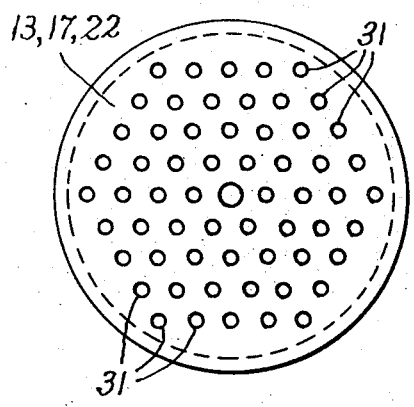
FIG. 2 is a plan view of a perforated plate for use in such a reactor.

Within column 12, plates 13 are suitably movably mounted on central core 21, which may be tubular for example. Plates 13 are in close contact with core 21 and, on their periphery, with the inner wall of column 12. As best seen in FIG. 2, plates 13 may be provided with a peripheral gasket of a reaction-resistant material such as fluorinated rubber or steel.

Above topmost perforated plate 22, a mixture of gas and suspension are withdrawn from reactor 11 and led to separator 23. The gas is returned to reactor 11 through line 24 to circulating compressor 14. Additional gas is introduced into the circulating gas stream at 25 as necessary. The suspension is removed from separator 23 through line 26.

In the reactor segments defined between adjacent plates 13, the height of bubble layer 27 and, therewith, of gas cushion 28, can be adjusted by changes in the volume of the gas and/or fluid streams through valves 29 and 30, respectively.

FIG. 2 is a plan view of a perforated plate 13 showing a suitable uniform distribution of apertures 31, all of the same size.

Figure 3:
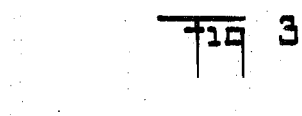
FIGS. 3A – 3C are side sectional views showing preferred aperture configurations.
Figure 3:
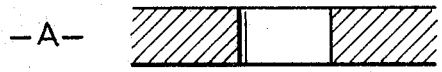
Figure 3:
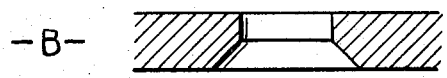
Figure 3:

FIG. 3A is a side view, in section, of a preferred aperture configuration in which the apertures have a right circular cylindrical section.

FIG. 3B is a side view, in section, of another preferred aperture configuration in which the circular apertures are beveled at their lower ends, i.e., on the bottom of plates 13.

FIG. 3C is a side view, in section, of still another preferred aperture configuration in which the apertures are frusto-conical in vertical section.

The reactor diameter, the spacing of the perforated plates, the number of perforations and their diameter, the distribution of the perforations, and the thickness of the plates and their gasketing, on the one hand, and the volume of the liquid and gas streams and the physical properties of the gas and liquids such as density, viscosity, and surface tension, on the other hand, influence the formation of a gas cushion and the degree of back-mixing of the liquid in the reactor.

It has been found that for each geometry of the perforated plates and reactor and at a given value of liquid throughput, there is a characteristic gas throughput at which there is no back-mixing through the perforated plates and a gas cushion is formed under the perforated plates. This flow condition is characterized as the "special flow condition."

At a constant aperture diameter and at a constant aperture number, the gas throughput necessary for reaching the "special flow condition" decreases with increasing liquid throughput, while simultaneously the liquid content in the individual reactor segments increases and the thickness of the gas cushion decreases. With the following definitions of the Reynolds numbers for the liquid and gas phase at a given aperture diameter, $d$, $$Re_{Ld} = w_{Ld} \times d \times \rho_L/\eta_L$$

and $$Re_{Gd} = w_{Gd} \times d \times \rho_G/\eta_G,$$

the following is the condition for gas cushion formation:

$$Re_{Ld}/Re_{Gd} = 0.1.$$

(For gases with very low densities, $\rho_G$, there is a significant departure from the aforementioned relationship.)

The loss in gas pressure in the bubble column-cascade reactor of the invention is given with an error of ±5 percent for all material pairs and geometries investigated, and for all possible flow conditions, by the empirical relationship given below. With a definition of the Froude number at a given reactor diameter, $D$, $$Fr_{GD} = w_{GD}^2 \times \rho_G/D \times g \times (\rho_L - \rho_G),$$

the following equation $$\Delta P_{total} = \epsilon \times \sigma_L \times h \times g \times n$$

is valid in the region $3 \times 10^{-7} < Fr_{GD} < 10^{-3}$.

The pressure loss coefficient, $\epsilon$, can be determined by means of the following dimensionless relationship:

$$\epsilon = 0.31 \times (D \times \phi)^{0.2}/Fr_{GD} \times h - 0.01 \, (D \times \phi)^{0.5}/Fr_{GD} \times h.$$

The symbols employed in these equations have the following meaning:
$d$—Aperture diameter
$D$—Reactor diameter
$g$—Gravitational constant
$h$—Spacing between adjacent perforated plates
$n$—Number of reactor segments
$\Delta P$—Pressure loss
$w$—Velocity
$\epsilon$—Pressure loss coefficient
$\eta$—Dynamic viscosity
$\sigma$—Density
$\phi$—Relative free aperture area
$Fr$—Froude number
$Re$—Reynolds number
Subscripts:
$d$—pertains to the aperture diameter
$D$—pertains to the reactor diameter
$G$—pertains to the gas phase
$L$—pertains to the liquid phase The bubble column-cascade reactor and the formation of gas cushions therein was first examined with model substances (Table I) and then chemical reactions were investigated (cf. Table II). Observations of gas cushion formation and of back-mixing were made using a transparent model.

The process according to the present invention is adaptable with particular advantage of the polymerization of unsaturated fatty acids with the aid of clay mineral catalysts. For this process, mono- and poly-unsaturated natural fatty acids having from 11 to 22 carbon atoms, particularly 18 carbon atoms, such as oleic acid, linoleic acid, and linolenic acid, or mixtures containing these acids, are employed.

As catalysts, crystalline clay minerals, particularly those having a high proportion of montmorillonite, are employed. Discontinuous processes for the polymerization of fatty acids in the presence of an inert gas and clay mineral catalysts are described in German DAS 1,134,666 and DAS 1,134,667, for example.

The clay minerals can also be modified by the addition of alkali metal salts or alkaline earth salts, as described in German DAS 1,280,852. The modification with lithium salts of clay catalysts for the polymerization of fatty acids is described in German DAS 1,443,938 and DAS 1,443,968.

Temperatures between 200° C. and 280° C. are employed for the continuous polymerization of fatty acids according to the invention. In order to avoid decarboxylation of fatty acids at elevated temperatures, it is appropriate to carry out the reaction in the presence of from 1 – 5 percent of water, calculated on the weight of fatty acid. The reaction is preferably performed under pressure. It is also possible to carry out the reaction at normal pressure, in which case a suitable amount of water is added to the inert gas, preferably nitrogen.

The advantage of the process of the invention, when applied to the polymerization of fatty acids, is, for one thing, evident in the savings usual in continuous processes. A special advantage is the purification brought about by the passage of gas through the product, which effects the smell of resins prepared therefrom.

The tests reported in Table I below were performed in a column 3 meters high equipped with four plates. The reactor was a temperature of 20° C., and the gas pressure was one atmosphere (STP).

The test reported in Table II below were performed with a liquid content in the reactor of 60 percent and with a gas cushion height of 20 mm. The liquid reacted was tall oil fatty acid: the solid catalyst was a clay mineral.

equidistantly stacked exactly horizontally in said reaction zone, adjacent plates being separated vertically by a distance at least three times the diameter of said columnar reaction zone and being tightly joined to the interior wall thereof, each plate having a plurality of apertures therein of the same size distributed uniformly over the area of the plate, the total free aperture area of the plates being from 0.5 percent to 15 percent of the cross-sectional area of said columnar reaction zone, the flow of inert gas and liquid through said reaction zone being such that Reynolds number$_{Ld}$/Reynolds number$_{Gd}$ = 0.1,
whereby a gas cushion is formed under said plates, and wherein Reynolds number$_{Ld}$ = $w_{Ld} \times d \times \sigma_L/\eta_L$,
Reynolds number$_{Gd}$ = $w_{Gd} \times d \times \sigma_G/\eta_G$,
$w$ = velocity
$d$ = aperture diameter
$\rho$ = density
$\eta$ = dynamic viscosity and the subscripts $d$, $G$, and $L$ refer respectively to aperture diameter, the gas phase, and the liquid phase.

2. A method as in claim 5 wherein said finely divided solid catalyst is present in the reagent stream entering the reactor in a weight, per unit time, which is up to 20 percent of the weight per unit time of liquid entering the reactor.

3. A method as in claim 1 wherein a liquid fatty acid

TABLE I

Tests with Model Substances in a Bubble Column-Cascade Reactor

| Liquid | Liquid Throughput (kg/hr) | Gas | Gas Throughput (kg/hr) | Aperture Diameter/ Column Diameter (mm/mm) | Aperture Area* (%) | Average Dwell Time (hrs) | Liquid Content (%) | Gas Cushion Height (mm) |
|---|---|---|---|---|---|---|---|---|
| 1) Dibutyl ether | 21.8 | N₂ | 38.5 | 4/140 | 2.49 | 0.9 | 50 | 100 |
| 2) Octene | 13.8 | N₂ | 17.2 | 2/140 | 1.6 | 1.5 | 57 | 55 |
| 3) Water | 46.4 | Air | 35.5 | 4/140 | 2.5 | 0.55 | 50 | 80 |
| 4) Water | 45.8 | Air | 14.8 | 2/140 | 1.6 | 0.65 | 59 | 40 |
| 5) Water | 29.2 | Air | 12.0 | 4/140 | 1.25 | 1.1 | 66 | 35 |
| 6) Water | 46.9 | Air | 4.0 | 4/140 | 2.5 | 0.93 | 87 | 0.0 |
| 7) Water | 46.9 | Air | 11.9 | 4/140 | 2.5 | 0.7 | 65 | 15 |
| 8) Water | 46.9 | Air | 19.0 | 4/140 | 2.5 | 0.62 | 58 | 40 |
| 9) Water | 46.9 | Air | 33.4 | 4/140 | 2.5 | 0.51 | 48 | 70 |

* Total aperture area of the plates as a percentage of the cross-sectional area of the empty reactor.

TABLE II

Tests with Chemical Reagents in a Bubble Column-Cascade Reactor

| Liquid Throughput (kg/hr) | Solid Throughput (kg/hr) | Gas | Gas Throughput (kg/hr) | Pressure/ Temperature (atm STP/ °C.) | Aperture Diameter Column Diameter (mm/mm) | Aperture Area* (%) | Mean-residence Time (hrs) | Column Height/ No. of Plates (m/-) | Polymerized Fatty Acids Yield (%) |
|---|---|---|---|---|---|---|---|---|---|
| 10) 38 | 3.8 | N₂ | 13 | 5/250 | 4/150 | 4 | 1.5 | 7.6/11 | 48 |
| 11) 38 | 3.8 | H₂O | 10 | 6/250 | 4/150 | 4 | 1.5 | 7.6/11 | 67 |
| 12) 38 | 3.8 | H₂O | 10 | 1/250 | 4/150 | 4 | 1.5 | 7.6/11 | 64 |

*Total aperture area of the plates as a percentage of the cross-sectional area of the empty reactor

What is claimed is:

1. A method for continuously effecting a solid-catalyzed liquid phase reaction which comprises flowing a liquid phase reagent, in the presence of said solid catalyst, and an inert gas upwardly through a walled vertically columnar reaction zone separated into a plurality of reaction compartments by perforated plates is polymerized in the presence of an inert gas employing a finely divided clay mineral catalyst.

4. A method as in claim 3 wherein the polymerization takes place in the additional presence of water vapor in the gas phase.

* * * * *